(No Model.)  2 Sheets—Sheet 1.
T. BURKHARD.
CANDY KETTLE.
No. 352,642.  Patented Nov. 16, 1886.
Fig 1.
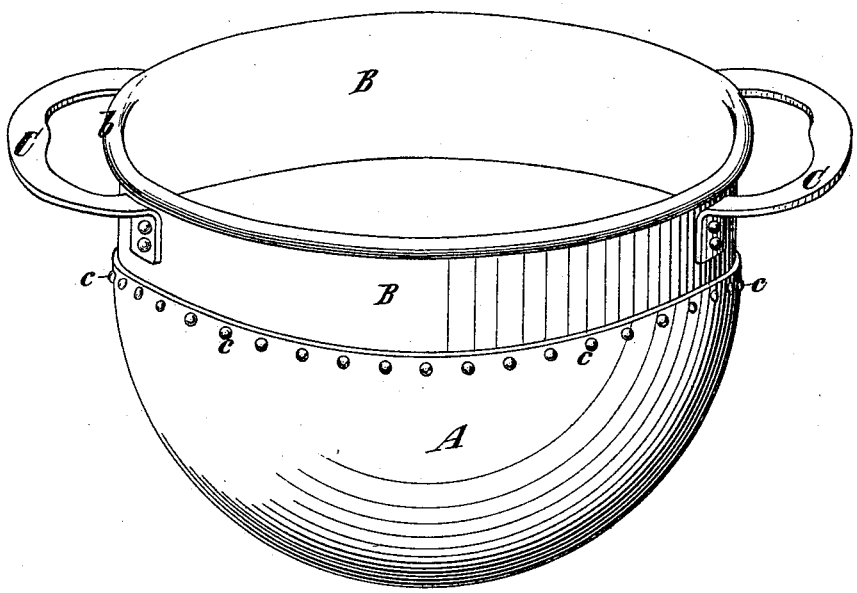
Fig 2.
Fig 3.
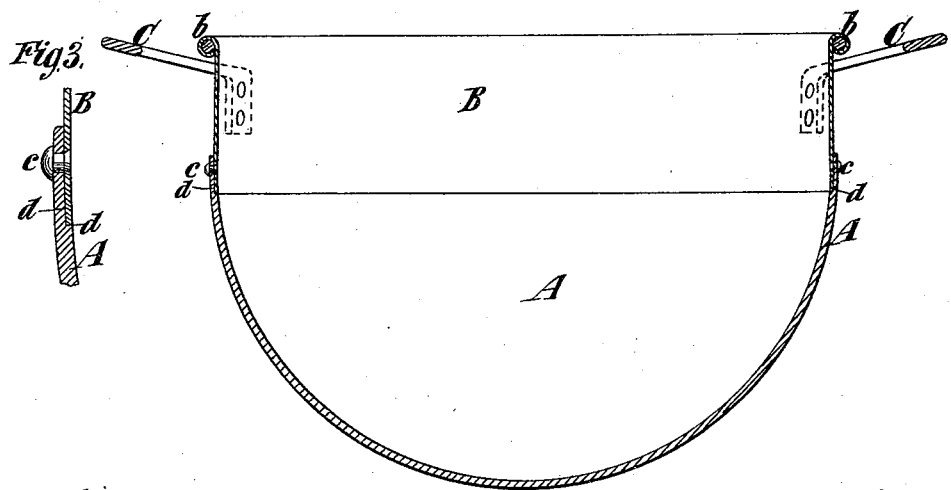
Witnesses:
C. L. Sundgren
Emil F. Herter
Inventor:
Thomas Burkhard
by his Atty's
Brown & Hall (No Model.)  2 Sheets—Sheet 2.
T. BURKHARD.
CANDY KETTLE.
No. 352,642. Patented Nov. 16, 1886.
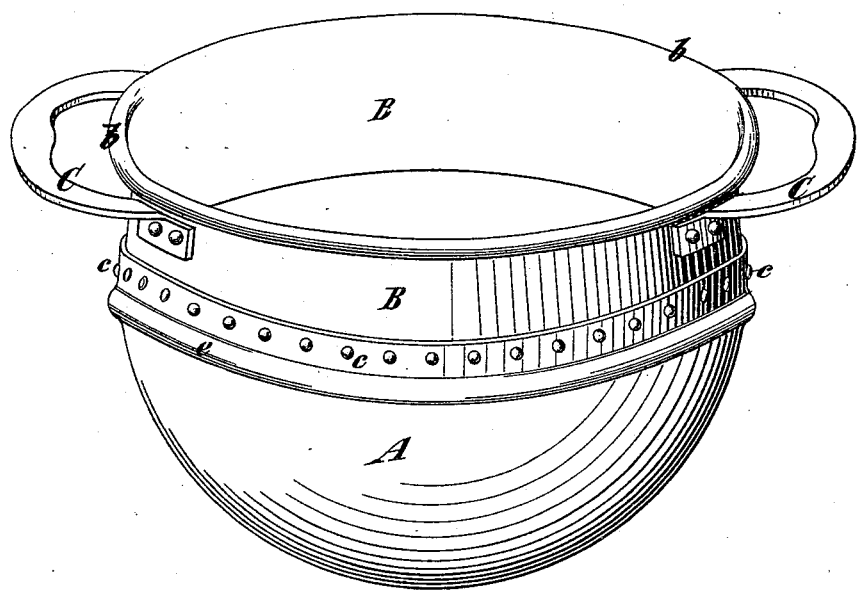
Fig. 4.
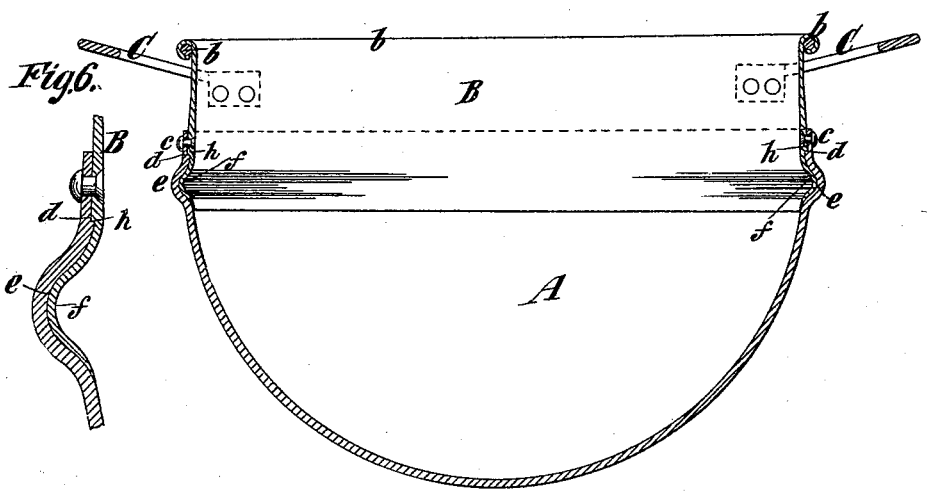
Fig. 5.
Fig. 6.
Witnesses:
C. E. Sundgren
Emil Herter
Inventor:
Thomas Burkhard
by his Attys
Brown & Hall

UNITED STATES PATENT OFFICE.

THOMAS BURKHARD, OF BROOKLYN, NEW YORK.

CANDY-KETTLE.

SPECIFICATION forming part of Letters Patent No. 352,642, dated November 16, 1886.

Application filed March 5, 1886. Serial No. 194,093. (No model.)

*To all whom it may concern:*

Be it known that I, THOMAS BURKHARD, of the city of Brooklyn, in the county of Kings and State of New York, have invented a new and useful Improvement in Candy-Kettles, of which the following is a specification.

The kettles heretofore employed for cooking candy have been made of copper or have had copper bottoms, and great care has to be exercised in their use, as they will burn at a temperature of about 300°, and by being once burned the copper undergoes some change, which will cause it always afterward to impart a burned taste to the candy cooked in it, even though the candy may not be overheated.

I have discovered that if a kettle which has its surface with which the candy comes in contact of cast-iron or cast-steel be employed for cooking candy the kettle will not, after being overheated, impart a burned taste to candy subsequently cooked in it. It is also desirable to have as large a portion of the kettle as possible formed of copper, as that is a material ordinarily employed in candy-kettles, and to which the trade is accustomed, and such material is also desirable because of its lightness as compared with cast iron or steel.

The invention consists in a candy-kettle composed of a concavo-convex shell of cast iron or steel, forming the bottom and a portion of the sides or body, and a body portion of copper inserted within the said shell, and at its lower edge forming an approximately flush joint with the shell upon the interior surface of the kettle.

In the accompanying drawings, Figures 1 and 2 are respectively a perspective view and a vertical section of a kettle embodying my invention. Fig. 3 is a sectional view, on a larger scale, of the joint between the copper body and the cast iron or steel bottom. Figs. 4 and 5 are views similar to Figs. 1 and 2 of a kettle also embodying my invention, and having a joint of modified form between the body and bottom; and Fig. 6 is a sectional view similar to Fig. 3, illustrating the joint of the kettle shown in Figs. 4 and 5.

Similar letters of reference designate corresponding parts in all the figures.

A designates a concavo-convex shell of cast iron or steel, which forms the bottom and a portion of the sides or body of the kettle, and B is the body proper, which is approximately cylindric, and to which are attached the handles C, whereby the kettle may be lifted. The body of the kettle, at its upper edge, may be strengthened by wiring, as at *b*.

The body B is preferably inserted into the upper edge of the bottom A, and is secured by rivets *c*, or otherwise. The lower edge portion of the body B forms an approximately flush joint with the interior of the kettle, so that the kettle may be readily cleaned, and no opportunity is afforded for the lodgment of candy, as would be the case if the body B formed a projection on the inner surface of the kettle at its lower edge.

The shell A not only forms the bottom of the kettle, but in reality forms a portion of the sides or body, and when the kettle is in use it is intended that no part of the contents shall come in contact with the copper body portion and be deteriorated thereby.

The joint between the bottom A and the body B of the kettle (shown in Figs. 1 and 2) is best illustrated in Fig. 3. As there shown, the bottom A has an internal rabbet, *d*, at its upper edge about equal in depth from the interior surface to the thickness of the copper body, so that when the copper body is inserted into and secured to the bottom the interior surfaces of the two will be about flush.

The joint between the bottom A and body B of the kettle (shown in Figs. 4 and 5) is best illustrated in Fig. 6. In this example of my invention, also, the body is inserted into the bottom, which is rabbeted at *d*, and the body has a shoulder, *h*, fitting this rabbet. The bottom has near the upper edge and below the rabbet *d* an outward circumferential indentation or recess, *e*, into which the body B is spun, hammered, or rolled outward, as at *f*. The line of rivets *c* is above the recess *e*, and the lower edge of the body B is thinned down, so as to form but a very slight shoulder, if any, on the interior of the kettle.

Inasmuch as the bottom of my improved kettle is of cast iron or steel, the candy will not be as easily burned as in a copper-bottomed kettle, and less care is necessary in its use, and even if one mess of candy be burned the kettle will not afterward impart a burned taste to the candy cooked in it.

Where that portion of a kettle with which the candy comes in contact is made of cast-iron or cast-steel, it will not, after being overheated, impart a burned taste to the candy subsequently cooked therein. It is furthermore desirable to make the upper portion of the body—or, in other words, as much of the kettle as is possible—of copper, because of its lightness, and also because copper is the material ordinarily employed in candy-kettles, and to which the trade is most accustomed. By inserting the copper body B within the shell A of cast-iron, which forms the bottom, I protect the edge portion of the copper from injury, as it would not be protected if the body portion B were slipped outside the shell A. It is desirable to so protect the edge portion of the copper body B, in order to prevent it from being bent and impaired, as would be liable to occur if the copper body were slipped outside the shell A. It is also desirable to have the copper body B form a flush joint with the bottom A at its lower edge, so that there will be no shoulder in the kettle to impede its proper cleaning.

What I claim as my invention, and desire to secure by Letters Patent, is—

The candy-kettle herein described, consisting of the concavo-convex shell A, of cast iron or steel, forming the bottom and a portion of the sides or body, and a body portion, B, of copper, inserted within the said shell, and at its lower edge forming an approximately flush joint with the shell upon the interior surface of the kettle, substantially as herein described.

THOMAS BURKHARD.

Witnesses:
FREDK. HAYNES,
HENRY MCBRIDE.